Jan. 23, 1962   A. E. STEELE   3,017,747
JET ENGINE THRUST AUGMENTATION SYSTEM
Filed Nov. 10, 1958

INVENTOR.
ALAN E. STEELE
BY
ATTORNEYS

United States Patent Office 3,017,747
Patented Jan. 23, 1962

3,017,747
JET ENGINE THRUST AUGMENTATION SYSTEM
Alan E. Steele, Middletown, Conn., assignor to the United States of America as represented by the Secretary of the Air Force
Filed Nov. 10, 1958, Ser. No. 773,117
3 Claims. (Cl. 60—35.6)

This invention relates to a thrust augmentation system for jet propulsion units and is more particularly concerned with providing an improved system for fuel combustion in the exhaust section of reaction type engines, thereby increasing the thrust without including the usual elements in the gas stream which cause cold pressure losses.

It is well known that a comparatively large portion of the oxygen in the air that is drawn into a jet engine is not used in the combustion chamber and passes through into the exhaust section of the engine. In many conventional engines, a mechanism known as an afterburner is installed which takes the place of the tail-pipe that is normally used as a conduit for the hot gas from the turbine wheel to the jet exhaust nozzle. The afterburner unit includes a series of spraybars and flameholders located directly in the gas stream. Fuel is sprayed into the gas stream upstream of the flameholders in the afterburner section and combines with the unused oxygen in the hot gas stream and acts to reheat the exhaust gases coming from the normal combustion area thereby accelerating the exhaust gases which results in greater reaction or thrust.

The actual amount of thrust gained by the use of an afterburner varies, depending upon the engine model. The amount of gain in between 20 percent and 30 percent of the thrust that the basic engine will develop at its military rated r.p.m. The increase in thrust is, of course, due to the difference in velocity of the exhaust gases leaving the exhaust nozzle. Even though the conventional afterburner increases the thrust considerably, there is a certain cold loss because of the location of the spraybars and flameholders in the path of the gas stream. These obstructions in the gas stream cause a loss in the total pressure of the stream, thereby lowering the amount of energy available in the stream. This loss of energy lowers the efficiency of thrust augmentation system.

The present invention discloses a system that has all of the advantages of the afterburner described above without the disadvantage of partially blocking the flow of gases and thus reducing the efficiency of the system. The spraybars and flameholders of the conventional afterburner are eliminated resulting in a clear flow path for the gas stream to flow through.

Accordingly, it is an object of the present invention to provide a system of thrust augmentation which is characterized by an absence of obstructions in the direct path of the exhaust gases, thereby increasing the energy of the jet stream and providing additional thrust.

Still another object of the invention is to provide an afterburner in which fuel is burned without the use of spraybars and flameholders. This is accomplished by using special hypergolic fuels which react when they impinge on one another. Pyrophoric fuels also may be used requiring only that injections be made into the proper part of the engine since this type of fuel reacts spontaneously with air.

A still further object of the invention is to provide an improved ram jet engine in which flameholders and spraybars are unnecessary thereby allowing substantially uninterrupted flow of gas through the engine.

These and other objects, features and advantages will become more apparent from the following description taken in connection with the illustrative embodiments in the accompanying drawings wherein:

FIG. 1 includes a cross section of a turbojet engine showing the position of the spraybars and flameholders;

Figure 1:
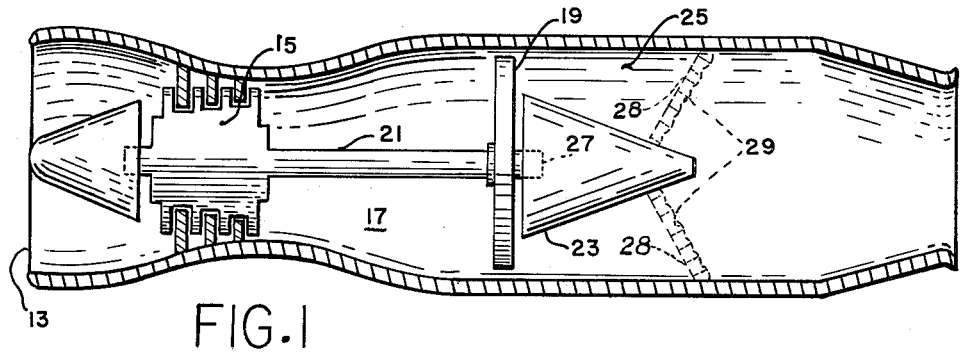

Referring now to FIG. 1 there is shown an illustration of a turbojet engine. Under normal operating conditions, the air stream enters the air inlet 13 and passes into the compressor stage 15. Fuel is injected and burned in the combustion chamber 17 causing the air stream to be heated and creating a mass of expanding gases having a certain amount of kinetic energy. A gas turbine 19 is located aft of the combustion chamber 17 and operates to transform some of the kinetic energy of the gases into rotational energy. The energy which is transformed by the turbine 19 is returned to the engine cycle through the shaft 21 in order to continue the cycle of gases.

Because of the temperature limitation placed upon the operation of the engine, the oxygen in the air mass is not completely burned during the fuel burning process in the combustion chamber. The unused oxygen becomes a large part of the accelerated air mass that passes through the turbine portion of engine. The present invention in one of its embodiments is particularly concerned with utilizing the unburned oxygen by having combustion occur aft of down-stream from the turbine. By this means the acceleration of the existing air mass is boosted, resulting in an additional thrust gain.

It should be remembered that any method employed to increase the acceleration of the exhaust gases would result in a greater reaction or thrust. If more heat is applied, the energy of the exhaust gases would increase and tend to accelerate. Thus, thrust augmentation by afterburning is a means for reheating the exhaust gases from the normal combustion area.

Located in the chamber aft of the turbine is the inner body 23 which forms part of the diffuser assembly consisting of a conical section of stainless steel, being larger in diameter at the front end than at the rear. The inner body 23 forms the inner wall of the diffuser section 25 and may house the turbine bearing 27. As the gases enter the chamber their velocity is reduced as a result of the expansion in the increasing area of the diffuser chamber.

In the conventional turbojet engine, the expanding gases pass over the spraybars 28 and thence the flameholders 29. The spraybars 28, interfere with the free passage of gases through the engine as well as the flameholders 29. However, the flameholders may block or constrict the free stream passage so as to accelerate the gases passing over them and thereby hindering the combustion process and could cause a "flameout" if the blockage is too great. The flameholders and spraybars add weight to the engine and their elimination will decrease the overall weight of the aircraft.

Figure 2:
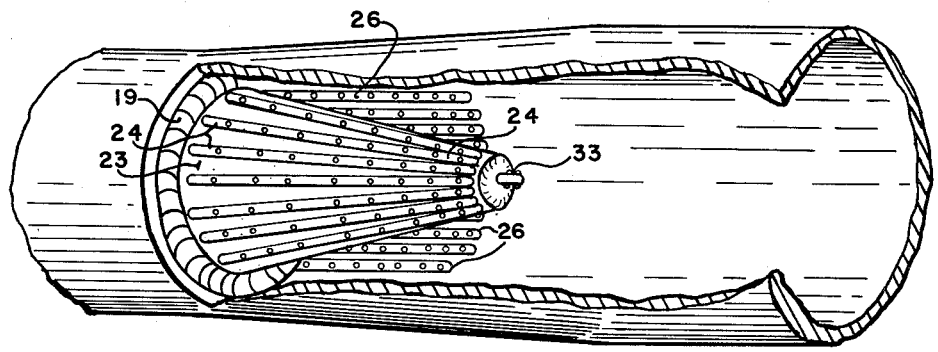
FIG. 2 is a drawing in perspective showing placement of the fuel injectors on the inner body and on the wall of the diffuser section.

The present invention eliminates the spraybars and flameholders entirely and instead injects the fuel into the gas stream from the walls of the diffuser section. In FIG. 2 there is shown a detailed view of a portion of the exhaust cone of a jet engine. The inner body 23 is located aft of the turbine 19 and is equipped with a plurality of orifices 24 therein for injecting fuel into the diffuser section. On the outer wall of the section another series of orifices 26 are located from which an oxidizer is injected which impinges on the injected fuels to react therewith and cause combustion. Any two fuels which are hypergolic may be used for this purpose.

Again referring to FIG. 2 a protuberance 33 may be included at the truncated end of the inner body 23. Orifices may be included therein for spraying fuel into the gas stream. In this embodiment of the invention, fuels of the pyrophoric type are injected from the orifices disposed on the outer wall, the inner body and the protuberance and ignite spontaneously when they contact the air stream. It can be seen that combustion in this portion of the engine will increase the velocity of the air mass resulting in additional thrust gain and in the absence of the flameholders and spraybars even greater gain can be expected. Where hypergolic fuels are added, the stream is heated and accelerated but the free oxygen in the stream does not necessarily take part in the combustion process because the hypergolic fuels contain their own oxidizer. When pyrophoric fuel is injected into the stream, the free oxygen does react and takes a part in the combustion process.

Figure 3:
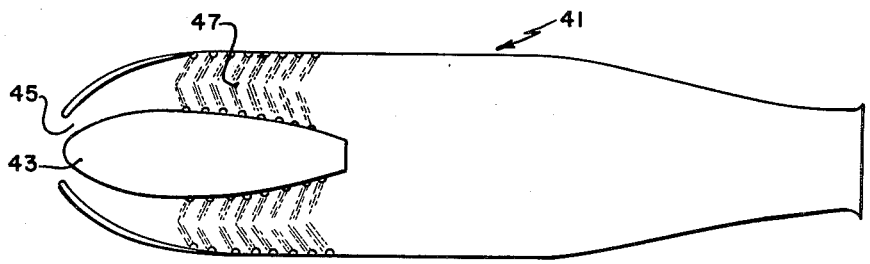
FIG. 3 is a schematic drawing of a ram jet engine showing the fuel supply system using hypergolic fuels.

The principles of fuel burning outlined above can also be applied to the ram jet engine. FIG. 3 shows a ram jet engine 41 having a diffuser 43 placed in the inlet 45. The purpose of the diffuser is to convert the kinetic energy of the incoming air into pressure energy, thereby slowing down the gas stream which is more conducive to ease of combustion. As in the case of turbojet afterburners, the ram jet ordinarily uses flameholders and spraybars for burning the fuel in the fast moving gas stream. Corresponding inefficiency results by placing these items in the gas stream.

In the present invention a plurality of orifices are placed on the wall of the diffuser 43 and corresponding orifices are placed on the wall of the engine in the region of the diffuser section 47. When the hypergolic substances coming from the orifices impinge on each other, combustion takes place and the air stream is heated resulting in increased thrust.

Figure 4:
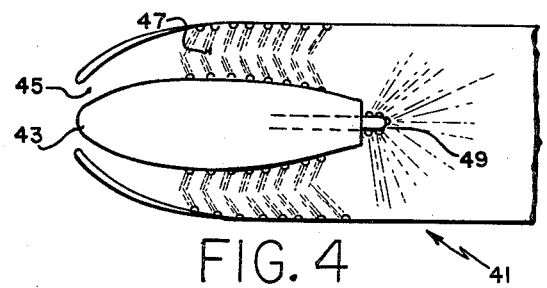
FIG. 4 shows the forward end of a ram jet engine showing the fuel supply system using pyrophoric fuels.

Pyrophoric fuel may also be used with the ram jet engine when the fuel system described herein is employed. When pyrophoric fuels are used the central fuel outlet 49 is added to cover the area immediately aft of the diffuser and to further heat the gas stream as its moves toward the exit nozzle. This feature is shown in FIG. 4.

In both turbojet and ram jet applications coverage of fuel and combustion zone can be selected by the pressure of the feed lines and by the geometry of the inner body and diffuser section. Ignition delay and "sweeping" of the injected fuels down-stream by the incoming gases can be controlled by injecting from orifices which direct the fuel in an upstream direction. In the case of hypergolic fuels both are directed upstream so as to impinge upon one another at a point about midway between the inner and outer walls of the diffuser section. When pyrophoric fuels are used the important consideration is that the total open cross-sectional area of the engine be covered so that all of the passing stream is heated. This is accomplished by spraying the fuel through the orifices directly into the gas stream.

By the use of the fuel system described herein the cold losses of 5% or more encountered by the conventional types of afterburners using spraybars and flameholders are eliminated and a correspondingly more efficient power plant results. Also, the elimination of flameholders and spraybars and having combustion take place further upstream allows the use of an afterburner of considerably shorter length resulting in a corresponding decrease in the overall weight of the engine.

Having thus described my invention and the advantages thereof, it will be understood that the invention is not to be limited to the details herein disclosed, but various changes and modifications may be made therein without departing from the true spirit and scope thereof.

What is claimed is:

1. In a jet-reaction propulsion unit for aircraft, an air inlet, a compressor stage for increasing the density of the air entering the inlet, a diffuser section into which the compressed air is directed said diffuser section having an outer wall and an inner wall, an inner body comprising a rearwardly extending frusto-conical surface forming said inner wall terminating at the rear of said diffuser section, the conical surface of said inner wall and the outer wall of said diffuser section having a plurality of axially and circumferentially spaced orifices therein, said orifices oriented to inject fuel into the entire area of said diffuser section in an upstream direction into the stream of expanding air to support combustion, increasing the temperature and accelerating the velocity of the air stream through said diffuser section of the propulsion unit, said accelerating heated air stream resulting in the development of thrust output of the propulsion unit.

2. The jet-reaction propulsion unit for aircraft described in claim 1, including a source of fuel in communication with the plurality of axially and circumferentially spaced orifices along the outer wall of said diffuser section and said inner body, said fuel being characteristically pyrophoric, said fuel being ignitable spontaneously on contact with the air stream, and a truncated portion on the end of said frusto-conical inner body having orifices therein for injecting additional pyrophoric fuel into the air stream.

3. In a jet-reaction propulsion unit for aircraft, a compressor for increasing the density of the incoming air, a combustion chamber in which the compressed air combines with injected fuel to heat and accelerate the gas stream, a turbine into which the accelerated gases flow, a diffuser section having inner and outer walls located aft of said turbine wheel for receiving the gases therefrom, said inner wall having the form of a rearwardly extending frusto-conical body terminating at the rear of said diffuser section, said body being provided with a plurality of axially and circumferentially spaced orifices, the outer wall of said diffuser section being provided with mutually opposed orifices, said orifices being oriented to inject fuel in the upstream direction into the entire area of said diffusion section such that the fuel ejected from the inner wall orifices in said frusto-conical body meets the fluid ejected from the mutually opposed outer wall orifices at a location substantially midway between said walls, the contacting of said ejected fluids with each other operating to support combustion and accelerate the gas stream to further increase the thrust output of the propulsion unit.

References Cited in the file of this patent

UNITED STATES PATENTS

| | | |
|---|---|---|
| 2,479,777 | Price | Aug. 23, 1949 |
| 2,503,472 | Chilowsky | Apr. 11, 1950 |
| 2,579,043 | Kallal | Dec. 18, 1951 |
| 2,639,581 | Cohen et al. | May 26, 1953 |
| 2,780,915 | Karen | Feb. 12, 1957 |
| 2,828,603 | Laucher | Apr. 1, 1958 |
| 2,890,108 | Toulmin | June 9, 1959 |
| 2,914,912 | Woll | Dec. 1, 1959 |
| 2,952,123 | Rich | Sept. 13, 1960 |

FOREIGN PATENTS

| | | |
|---|---|---|
| 613,181 | Great Britain | Nov. 23, 1948 |
| 761,167 | Great Britain | Nov. 14, 1956 |